United States Patent
Robadey et al.

(10) Patent No.: US 10,824,930 B2
(45) Date of Patent: Nov. 3, 2020

(54) RFID TAG

(71) Applicant: ASSA ABLOY AB, Stockholm (SE)

(72) Inventors: Jean-Miguel Robadey, Bossonnens (CH); Elies Ennabli, Lausanne (CH); Hugo Kapp, St Gingolph (FR)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/443,145

(22) Filed: Jun. 17, 2019

(65) Prior Publication Data
US 2019/0385037 A1    Dec. 19, 2019

(30) Foreign Application Priority Data

Jun. 18, 2018 (EP) .................................. 18178270

(51) Int. Cl.
| | |
|---|---|
| *G06K 19/077* | (2006.01) |
| *A01K 11/00* | (2006.01) |
| *G06K 19/07* | (2006.01) |
| *H01Q 1/22* | (2006.01) |
| *H04B 5/00* | (2006.01) |

(52) U.S. Cl.
CPC ...... *G06K 19/07758* (2013.01); *A01K 11/004* (2013.01); *A01K 11/006* (2013.01); *G06K 19/0723* (2013.01); *H01Q 1/2225* (2013.01); *H04B 5/0075* (2013.01)

(58) Field of Classification Search
CPC .............. A01K 11/004; A01K 11/006; G06K 19/0723; G06K 19/07758; H01Q 1/2225; H04B 5/0062; H04B 5/0075; H04B 5/0081
See application file for complete search history.

(56) References Cited

U.S. PATENT DOCUMENTS

| | | |
|---|---|---|
| 6,275,157 B1 | 8/2001 | Mays et al. |
| 6,366,260 B1 | 4/2002 | Carrender |
| 2013/0092743 A1* | 4/2013 | Stobbe ..................... H01Q 9/26 235/492 |
| 2015/0161874 A1 | 6/2015 | Thyroff et al. |

(Continued)

FOREIGN PATENT DOCUMENTS

| | | |
|---|---|---|
| CN | 203133919 U | 8/2013 |
| DE | 19822383 A1 | 12/1999 |
| DE | 102005042444 A1 | 3/2007 |

(Continued)

OTHER PUBLICATIONS

"European Application Serial No. 18178270.7, Extended European Search Report dated Jan. 4, 2019", 9 pgs.

*Primary Examiner* — Omeed Alizada
(74) *Attorney, Agent, or Firm* — Schwegman Lundberg & Woessner, P.A.

(57) ABSTRACT

An RFID tag to be used, for example, for tagging livestock. The RFID tag has a high resistance to mechanical and thermal stress due to a physical separation of a main antenna and an integrated circuit forming an RFID circuit. The RFID tag may comprise an inlay with the main antenna and a chip module with the integrated circuit and a loop antenna inductively coupled to the main antenna. The inlay and the chip module are safely embedded in a tag housing. The compact chip module with electrical connections between the loop antenna and the integrated circuit can be reliably protected.

20 Claims, 4 Drawing Sheets

(56) References Cited

U.S. PATENT DOCUMENTS

2018/0007863 A1* 1/2018 Bailey ..................... B32B 7/12

FOREIGN PATENT DOCUMENTS

| | | | |
|---|---|---|---|
| DE | 102007016584 A1 | 1/2008 | |
| DE | 102007029083 A1 | 12/2008 | |
| DE | 102008027246 A1 | 12/2009 | |
| DE | 102011116399 A1 | 4/2013 | |
| DE | 102013217366 A1 | 11/2014 | |
| DE | 202016101289 U1 * | 4/2016 | ....... G06K 19/07758 |
| DE | 202016101289 U1 | 5/2016 | |
| EP | 1970840 A1 | 9/2008 | |
| EP | 1687761 B1 | 3/2010 | |
| EP | 2405054 B1 | 2/2013 | |
| EP | 2446398 B1 | 7/2018 | |
| EP | 3217566 B1 | 8/2018 | |
| JP | 5609962 B2 | 12/2012 | |
| KR | 101275894 B1 | 6/2013 | |
| RO | 132616 A1 | 5/2018 | |
| WO | WO-2014164836 A1 | 10/2014 | |

* cited by examiner

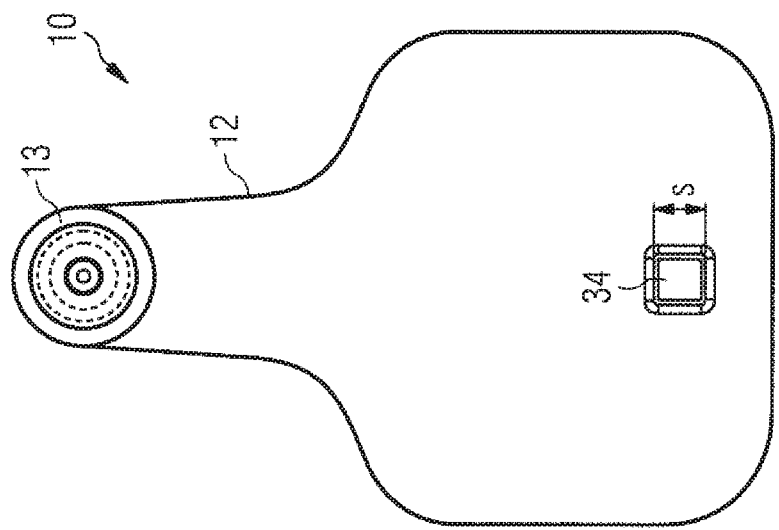
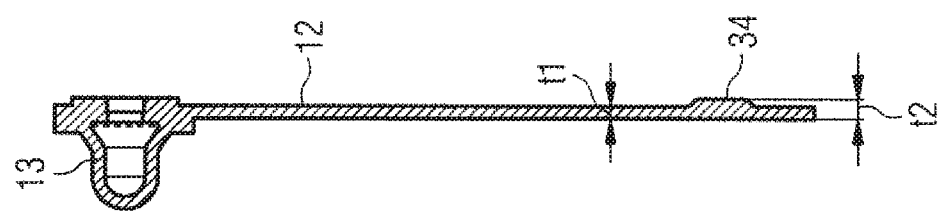
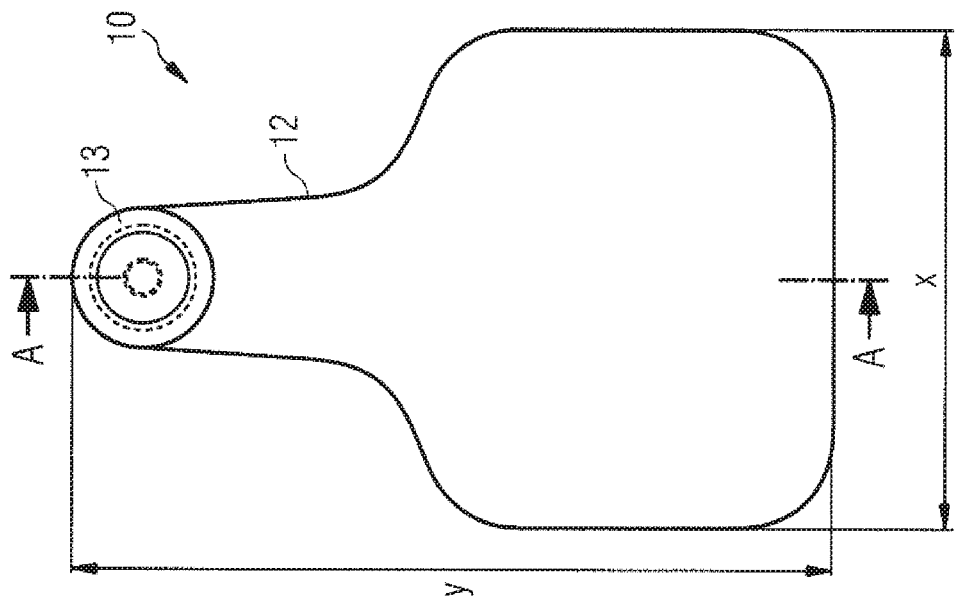

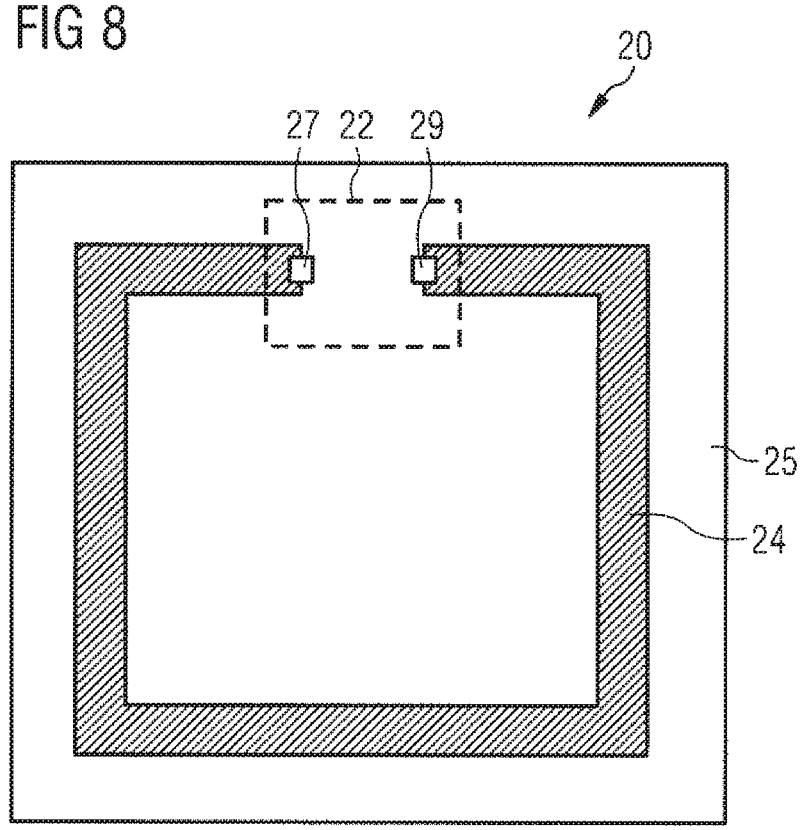

RFID TAG

CROSS-REFERENCE TO RELATED APPLICATIONS

This application claims priority to European Patent Application No. EP18178270.7, titled "RFID Tag," filed Jun. 18, 2018, which is hereby incorporated by reference herein in its entirety.

TECHNICAL FIELD

The present disclosure generally relates to a radio-frequency identification (RFID) tag, in particular, an RFID tag to be attached to livestock, for example, cows or other farm animals, for identifying the same.

BACKGROUND

Generally, there are several solutions using RFID tags for identifying livestock, for example, cows. These solutions use either low frequency (LF), high frequency (HF), or ultra-high frequency (UHF) technology. For example, the tags are attached to ears of the cows in order to tag the same.

Using a UHF solution for tagging has the advantage that it provides for a long range read capability. This may allow, for example, for bulk scanning of cows on the way back to the farm or identifying a specific cow in a group of cows from a distance.

Typically, a conventional ear tag includes a housing made of plastic material and including an electronic unit comprising an antenna and a chip on a substrate.

RFID tags for livestock, for example, cows or other farm animals, are subjected to extreme conditions during their lifetime. In particular, the tags may be bent or twisted many times, and must be able to withstand extreme temperature variations.

The present disclosure is directed, at least in part, to improving or overcoming one or more aspects of prior systems.

SUMMARY OF THE DISCLOSURE

According to one aspect of the present disclosure, an RFID tag comprises a tag housing, an inlay embedded in the tag housing, and a chip module embedded in the tag housing. The tag housing includes an attachment portion configured to allow for a secure attachment of the RFID tag to a target. The inlay includes a substrate and a main antenna provided on the substrate. The chip module includes an integrated circuit and a loop antenna electrically connected to the integrated circuit. Further, the loop antenna is inductively coupled to the main antenna and forms an RFID circuit, in particular, for UHF communications, with the integrated circuit and the main antenna. In certain embodiments, the main antenna is configured as a pair of metallic surface portions arranged on opposite sides of the inlay and connected to each other by a linear connecting portion extending around at least part of the chip module.

Other features and aspects of the present disclosure will be apparent from the following description and the accompanying drawings.

BRIEF DESCRIPTION OF THE DRAWINGS

FIG. 5 is a bottom view of an RFID tag according to the present disclosure;

FIG. 6 is a schematic cross-section along the line A-A in FIG. 5;

FIG. 7 is a plan view of the RFID tag according to the present disclosure; and

FIG. 8 is a schematic plan view of a chip module according to the present disclosure.

DETAILED DESCRIPTION

Figure 1:
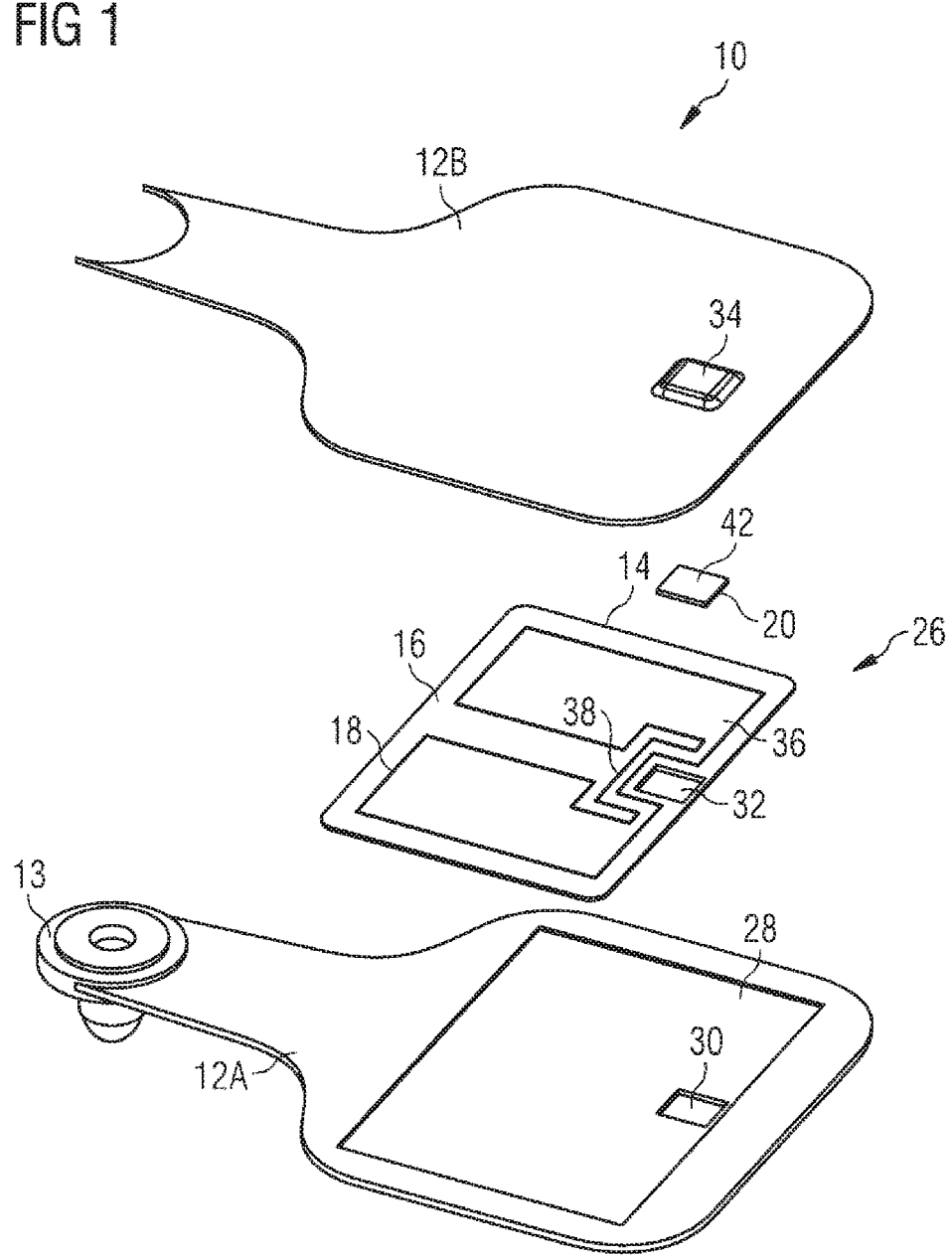
FIG. 1 is an exploded view of an example RFID tag in accordance with the present disclosure.

The following is a detailed description of example embodiments of the present disclosure. The example embodiments described herein are intended to teach the principles of the present disclosure, enabling those of ordinary skill in the art to implement and use the present disclosure in many different environments and for many different applications. Therefore, the example embodiments are not intended to be, and should not be considered as, a limiting description of the scope of protection. Rather, the scope of protection shall be defined by the appended claims.

The present disclosure is based at least in part on the realization that a conventional UHF antenna inlay of an RFID tag that is subjected to harsh conditions, for example, when the RFID tag is used for the tagging of farm animals, has a weak point at the connection of the chip to the antenna. For example, the connection may be damaged due to high pressure and high temperature during overmolding of the chip and the antenna. Furthermore, the extreme conditions to which the tag is subjected while it is in use also put a large stress on the chip-antenna connection. In particular, the chip can break or be disconnected from the antenna, and this may result in a dramatic reduction of the read range or may even destroy the tag. According to the present disclosure, this problem is overcome by physically separating the chip-antenna connection from the main part of the antenna. Accordingly, the chip-antenna connection between a smaller antenna, which is coupled to the main antenna, and the chip can be made mechanically robust, so that it is not affected by the extreme conditions or an overmolding stress. At the same time, the main part of the antenna can be flexible and use the conventional inlay technology.

In this respect, the present disclosure is also based on the realization that a special type of antenna design can be used to obtain the above-mentioned advantages, namely, an inductively coupled feeding or loop antenna that is relatively small in size, coupled with a radiating main antenna that is much bigger in size. In such a configuration, the RFID antenna consists of the loop antenna and the radiating main antenna, and the two end portions of the loop antenna are physically connected to the chip. With this configuration, RFID communications can be performed in a known manner using the combined antenna and an integrated circuit provided on the chip.

The present disclosure is also based in part on the realization that UHF communication should advantageously be used to allow for a relatively long read range that is useful or necessary in farming applications. In this respect, it has also been realized that the main antenna may desirably have a surface area that is relatively large, or even substantially as large as possible. This can be achieved by providing a main antenna that is configured as at least one metallic surface portion (as a continuous layer) formed on a substrate of the inlay. Further, a compact module is used for the relatively small loop antenna and the chip, i.e., the integrated circuit. In particular, the loop antenna and the integrated circuit can be provided on a robust FR4 substrate, using known printed circuit board (PCB) technology, and the loop antenna can be securely connected to the integrated circuit by soldering, for example, using gold or nickel. In addition, the robustness of the chip module can further be increased by laminating the same with additional protectives layers, for example, prepreg layers. The loop antenna can be formed as an etched copper antenna on a substrate, for example, an FR4 substrate. In particular, the substrate could have a glass transition temperature that is high enough such that the module is not adversely affected by an overmolding process.

The present disclosure is also based in part on the realization that the loop antenna and the main antenna may desirably have a specific configuration and positional relationship with respect to each other to maximize the inductive coupling. Advantageously, the module including the loop antenna could be surrounded at least in part by the main antenna. In particular, using a main antenna that includes two large metallic surfaces connected to each other by a linear connecting portion extending at least in part around the chip module allows for both an efficient use of the available space in the tag and a good coupling between the antennas.

The present disclosure is also based in part on the realization that providing a lower housing on which the antennas and the chip are provided and forming the housing by overmolding of said components arranged on the lower housing effectively seals the tag and completely covers the electronic components, such that they are protected against an ingress of water and dust. Further, the mechanical strength of the tag can also be assured in this manner. In particular, an increased thickness portion of the overmolding can be formed at a position that corresponds to the position of the chip module inside the housing, to further protect the connection between the loop antenna and the integrated circuit.

Referring now to the drawings, FIG. 1 shows an exploded view of an example RFID tag 10 in accordance with the present disclosure. As shown in FIG. 1, RFID tag 10 comprises a tag housing 12 (see also FIGS. 5-7). Tag housing 12 is made of a plastic material, for example, thermoplastic polyurethane (TPU), and includes a lower housing 12A and an upper housing 12B sandwiching an inlay 14 and a chip module 20 between the same. Further, tag housing 12 includes an attachment portion 13 configured to allow for a secure attachment of RFID tag 10 to a target, for example, a cow, another farm animal, or any other animal or object for which RFID tracking is desired. In particular, RFID tag 10 may be configured as an ear tag to be attached to an ear of such a farm animal in a known manner. As ear tags and the manner of attachment of the same are generally known, the details with respect to attachment portion 13, for example, configured as a female attachment portion to receive a corresponding male member, and the attachment of tag housing 12 will not be described herein in further detail.

As also shown in FIG. 1, inlay 14 is embedded in tag housing 12 and includes a substrate 16 and a main antenna 18 provided on substrate 16. In an embodiment, inlay 14 is configured as a flexible, substantially rectangular plate-shaped member with a thickness of, for example, no more than 0.1 mm. Substrate 16 may be made of polyethylene terephthalate (PET) or other plastics. Main antenna 18 may be formed as an etched antenna made of, for example, aluminum or any other metallic material with a thickness of, for example, 0.01 mm or other suitable thickness. As shown in FIG. 1, main antenna 18 may include two extended metallic surface portions 36 formed on substrate 16. Each metallic surface portion 36 may be substantially rectangular and cover an extended portion of substrate 16. In the example shown in FIG. 1, two metallic surface portions 36 are formed on opposite sides of inlay 14 and are symmetrical with respect to a center line (not shown) of inlay 14. For example, as shown in FIG. 1, two symmetrical metallic surface portions 36 may be formed on opposing portions of a first face of inlay 14. The two metallic surface portions 36 are connected to each other by a linear connecting portion 38 that extends between the same. In particular, as shown in FIG. 1, linear connecting portion 38 extends around part of chip module 20 (cut-out portion 32). For example, a plurality of linear sections may be connected in an appropriate manner to extend around cut-out portion 32. Of course, connecting portion 38 may have any other suitable configuration.

Metallic surface portions 36 may cover at least 60%, and in some embodiments may preferably cover at least 80%, of a total area of substrate 16. As shown in FIG. 1, each metallic surface portion 36 is formed as a thin plate-shaped member (layer) covering substrate 16. It will be readily appreciated that the rectangular shape shown in FIG. 1 is only exemplary, and that other appropriate shapes, for example, circular or elliptic shapes can also be used. In addition, the number of surface portions 36 is not limited to two, but could also be one, three, or more, as long as the total surface area is sufficient, as described above.

FIG. 1 further shows how chip module 20 and inlay 14 are embedded in housing 12. In particular, chip module 20 and inlay 14 may be embedded by providing the same on lower housing 12A, and then overmolding the same to form upper housing 12B. The process of overmolding is well-known, such that the details will not be described herein.

Figure 2:
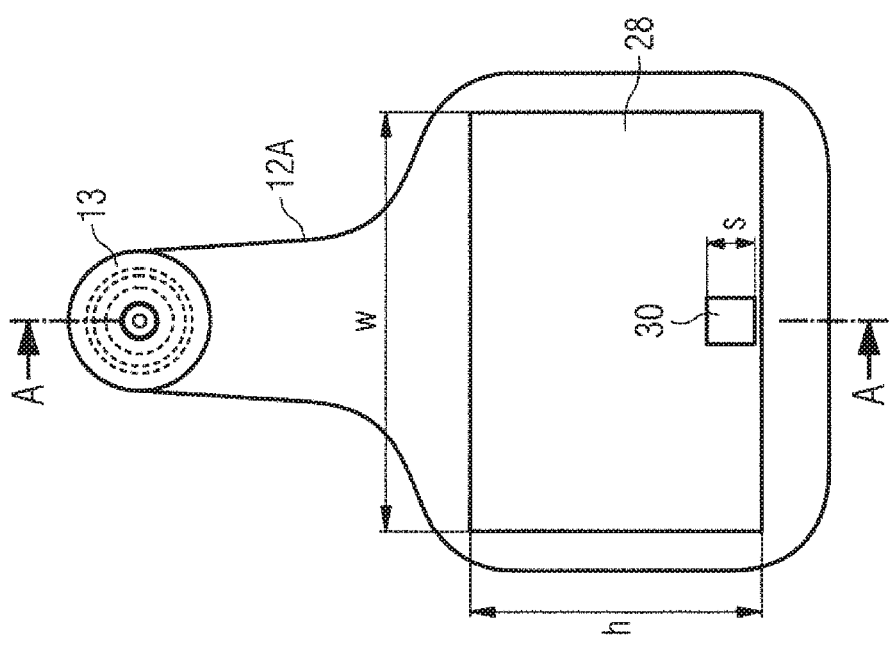
FIG. 2 is a plan view of a bottom housing in accordance with the present disclosure.

In order to position inlay 14 on lower housing 12A, an inlay recess 28 configured to receive inlay 14 and position the same with respect to the housing 12A is formed in lower housing 12A. The dimensions of inlay recess 28 may substantially match the dimensions of inlay 14. For example, as shown in FIG. 2, inlay recess 28 may have a width w of around 65 mm and a height h of around 45 mm. Prior to overmolding, inlay 14 may be attached to lower housing 12A, for example, using an adhesive or the like.

Figure 4:
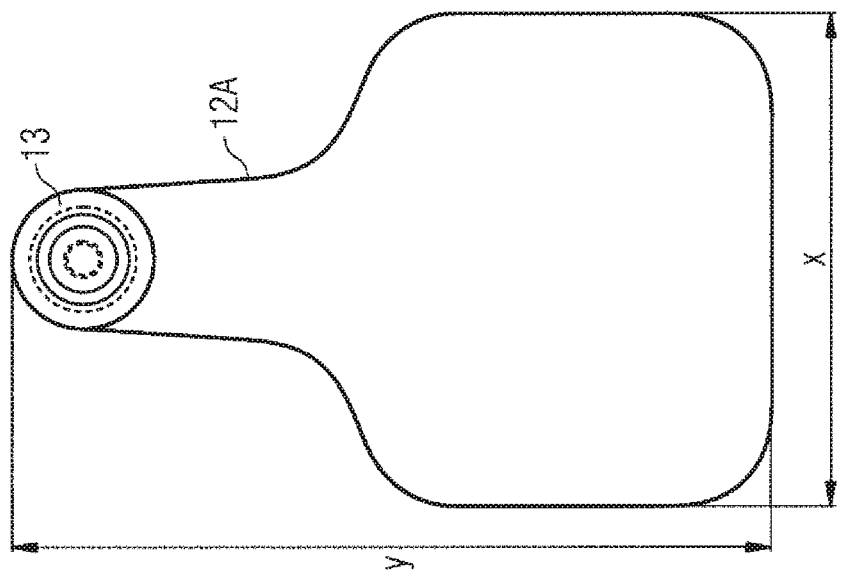
FIG. 4 is a bottom view of the bottom housing.
Figure 3:
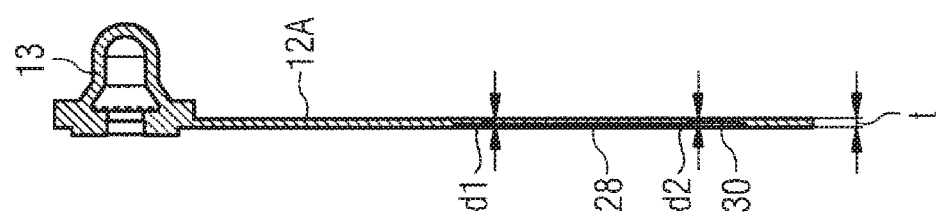
FIG. 3 is a cross-section along the line A-A in FIG. 2.

Lower housing 12A may further include a module recess 30 configured to receive chip module 20 and position the same with respect to lower housing 12A and, accordingly, inlay 14. For example, module recess 30 may be formed at a bottom of inlay recess 28. For example, inlay recess 28 may have a depth d1 of around 0.2 mm, and module recess 30 may have a depth d2 of around 0.6 mm measured from the upper surface of upper housing 12A (see also FIG. 3). A total thickness t of lower housing 12A may be, for example, around 1.0 mm. Module recess 30 may be substantially square with sides of length s, for example, around 7 mm. As shown in FIG. 4, the overall dimensions of bottom housing 12A, which may substantially correspond to the overall dimensions of RFID tag 10 in the assembled state, include a width X of around 80 mm and a height Y of around 120 mm. It will be readily appreciated, however, that the above dimensional values of the preceding paragraphs are only exemplary and may vary to some extent in various embodiments.

As shown in FIG. 1, inlay 14 further includes a cut-out portion 32 configured to receive chip module 20. Here, a shape of cut-out portion 32 corresponds to a shape of module recess 30, such that chip module 20 is received within module recess 30 and cut-out portion 32. Advantageously, the thickness of chip module 20 (for example, around 1 mm) may be selected such that, in the state where chip module 20 is inserted in module recess 30 and cut-out portion 32, an upper surface of chip module 20 is substantially flush with an upper surface of inlay 14. Accordingly, a loop antenna 24 formed on chip module 20, which will be described in more detail below, can be arranged substantially in the same plane as main antenna 18.

Chip module 20 is shown in more detail in FIG. 8. As shown in FIG. 8, chip module 20 includes an integrated circuit 22 and loop antenna 24 electrically connected to integrated circuit 22. In particular, integrated circuit 22 and loop antenna 24 are formed on a printed circuit board 25, for example, an FR4 substrate. Loop antenna 24 may be connected to integrated circuit 22 by soldering end portions 27, 29 of loop antenna 24 to corresponding connection terminals (not shown) of integrated circuit 22. Loop antenna 24 may have any appropriate shape, as long as it forms a closed circuit. In particular, loop antenna 24 may be formed as a conductive pattern on printed circuit board 25 in a known manner. For example, loop antenna 24 may be an edged copper pattern. Further, loop antenna 24 may include between one and three turns, inclusive, for example, two turns. Further, loop antenna 24 may be considerably smaller than main antenna 18. For example, a ratio of an area of loop antenna 24 on printed circuit board 25 to an area of main antenna 18 on substrate 16 may be between $1/20$ and $1/50$, inclusive, and in some embodiments may preferably be between $1/30$ and $1/40$, inclusive.

As will be apparent from the above, loop antenna 24 is not electrically (physically) connected (e.g., not direct or conductively coupled) to main antenna 18, but only to integrated circuit 22. Instead, loop antenna 24 is inductively coupled to main antenna 18. Thereby, loop antenna 24, integrated circuit 22, and main antenna 18 form an RFID circuit (transponder) 26. In particular, integrated circuit 22, loop antenna 24, and main antenna 18 may be configured for performing UHF communications in a known manner. Here, it will be readily appreciated by the skilled person that an alternating current (AC) magnetic field produced, for example, by a reader device, will generate an alternating current in main antenna 18. Consequently, main antenna 18 will induce an AC voltage in loop antenna 24, which may power integrated circuit 22 for performing communications with the reader device in a known manner using the RFID protocol. Accordingly, loop antenna 24 and main antenna form a combined antenna for RFID communication, where the connection of said combined antenna to integrated circuit 22 is formed in chip module 20, which is a compact module that is resistant to mechanical and thermal stress generated during use of RFID tag 10. Therefore, a reliable RFID tag 10 with a long lifetime is obtained. Chip module 20 may further be protected by an increased thickness portion 34 that is formed in upper housing 12B at a position that corresponds to the position of chip module 20 inside housing 12. In order to further protect chip module 20, for example, during overmolding of the same, printed circuit board 25 may be laminated with at least one protective layer 42, for example, one or more prepreg layers.

FIGS. 5 to 7 show an assembled RFID tag 10. FIG. 5 shows a bottom view of RFID tag 10, FIG. 6 shows a corresponding section along the line A-A in FIG. 5, and FIG. 7 shows a plan view of RFID tag 10. It should be noted that, for the sake of simplicity, the internal structure of RFID tag 10 is not shown in the cross-section of FIG. 6. Here, as shown in FIG. 6, in an embodiment, RFID tag 10 may be formed as a substantially flat, plate-like member with a thickness t1 of around 1.8 mm or other suitable thickness. Further, as shown in FIG. 6, a thickness at increased thickness portion 34 may be substantially larger, for example, around 2.75 mm or other suitable thickness.

INDUSTRIAL APPLICABILITY

As described above, with the RFID tag according to the present disclosure, a reliable and durable RFID tag for use in harsh conditions can be obtained. In particular, due to the physical separation of main antenna 18 and integrated circuit 22, a risk of damaging a corresponding connection between the same during use of RFID tag 10 can be eliminated. Instead, the physical (electrical) connection between the antenna and integrated circuit 22 is realized by electrically connecting (e.g., direct or conductively coupling) the much smaller loop antenna 24 to integrated circuit 22 and integrating the same into the compact chip module 20. Chip module 20, i.e., loop antenna 24, is inductively coupled to main antenna 18 to form RFID circuit 26, and for particular embodiments, for UHF communications.

While the embodiment has been described with respect to RFID tags for livestock, for example, for attaching to an ear of a cow or another farm animal via attachment portion 13, it will be readily appreciated that the technology disclosed herein can be used in any application where there is a demand for an RFID tag that can withstand harsh environments, in particular, mechanical and thermal stress. Therefore, the RFID tag disclosed herein is not limited to an application for tagging livestock or the like.

Likewise, it will be readily appreciated that the shape and the size of the RFID tag and its components as disclosed herein are only exemplary, and many different shapes and/or appropriate sizes can be used depending on the application. One important aspect is that the RFID tag according to the present disclose includes a main antenna that is relatively or considerably larger than the loop antenna that is electrically connected to the integrated circuit, and that the loop antenna is only inductively coupled to the main antenna. In this manner, a compact module including the loop antenna and the integrated circuit can be formed, while ensuring, in particular, the relatively large surface area of the main antenna that may be desired or required in order to perform RFID communications over the desired range.

While inlay 14 has been described above as being a thin and flexible inlay, it will be readily appreciated that, in other applications, inlay 14 may not be flexible and may have, for example, an increased thickness.

Further, it should also be appreciated that, while it has been described above that preferably loop antenna 24 should be in the same plane as main antenna 18, in other embodiments, it may be sufficient that loop antenna 24 is positioned close to main antenna 18, for example, adjacent to the same or overlapping the same, as long as main antenna 18 and loop antenna 24 remain inductively coupled to each other.

Further, it will be appreciated that, in other applications, inlay recess 28 and/or module recess 30 may be omitted. Likewise, housing 12 may be formed in any appropriate manner, and does not necessarily have to be formed by arranging, for example, by gluing, inlay 14 and/or chip module 20 on lower housing 12A and then overmolding the same to form upper housing 12B. Further, increased thickness portion 34 may be omitted in some applications.

In addition, while it has been described above that loop antenna 24 is soldered to integrated circuit 22, in other applications, loop antenna 24 may be part of integrated circuit 22 or may be electrically connected to the same in another manner.

An example surface area of main antenna 18 may be 40 mm×60 mm. However, it will be readily appreciated that larger or smaller antennas can be used, depending on the application.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although certain embodiments of the present disclosure have been described herein, improvements and modifications may be incorporated without departing from the scope of the following claims.

The invention claimed is:

1. An RFID tag comprising:
a tag housing, the tag housing including an attachment portion configured to allow for a secure attachment of the RFID tag to a target;
an inlay embedded in the tag housing, the inlay including a substrate and a main antenna provided on a surface of the substrate; and
a chip module embedded in the tag housing, the chip module including an integrated circuit and a loop antenna electrically connected to the integrated circuit;
wherein the loop antenna is configured for inductive coupling to the main antenna, forming an RFID circuit with the integrated circuit and the main antenna; and
wherein the main antenna is configured as a pair of symmetrical metallic surface portions arranged on opposite sides of the inlay and connected to each other by a linear connecting portion extending around at least part of the chip module, and wherein the pair of symmetrical metallic surface portions covers at least 60% of the surface of the substrate.

2. The RFID tag of claim 1, wherein the tag housing is made of a plastic material and includes a lower housing and an upper housing sandwiching the inlay and the chip module.

3. The RFID tag of claim 2, wherein at least one of the lower housing or the upper housing includes an inlay recess configured to receive the inlay and position the inlay with respect to the at least one of the lower housing or the upper housing.

4. The RFID tag of claim 3, wherein at least one of the lower housing or the upper housing includes a module recess configured to receive the chip module and position the chip module with respect to the at least one of the lower housing or the upper housing.

5. The RFID tag of claim 4, wherein the module recess is formed at a bottom of the inlay recess.

6. The RFID tag of claim 2, wherein the upper housing is formed by overmolding of the inlay and the chip module provided on the lower housing.

7. The RFID tag of claim 5, wherein the upper housing is formed by overmolding of the inlay and the chip module provided on the lower housing.

8. The RFID tag of claim 6, wherein the upper housing comprises an increased thickness portion at a position that corresponds to the position of the chip module inside the housing.

9. The RFID tag of claim 2, wherein at least one of the inlay and the chip module is attached to the lower housing by means of an adhesive.

10. The RFID tag of claim 5, wherein the inlay and the chip module are each attached to the lower housing by means of an adhesive.

11. The RFID tag of claim 1, wherein the inlay includes a cut-out portion configured to receive the chip module.

12. The RFID tag of claim 10, wherein the inlay includes a cut-out portion configured to receive the chip module.

13. The RFID tag of claim 1, wherein each of the metallic surface portions of the pair of metallic surface portions of the main antenna comprises a substantially rectangular metallic surface portion.

14. The RFID tag of claim 1, wherein the loop antenna is arranged substantially in the same plane as the main antenna.

15. The RFID tag of claim 1, wherein the integrated circuit and the loop antenna are formed on a printed circuit board, the loop antenna being soldered to the integrated circuit.

16. The RFID tag of claim 15, wherein the printed circuit board comprises an FR4 substrate.

17. The RFID tag of claim 15, wherein the printed circuit board is laminated with at least one protective layer.

18. The RFID tag of claim 1, wherein the loop antenna comprises between one to three turns, inclusive.

19. The RFID tag of claim 1, wherein a ratio of an area of the loop antenna to an area of the main antenna is between $1/20$ and $1/50$, inclusive.

20. An RFID tag comprising:
an inlay including a substrate and a main antenna provided on a surface of the substrate; and
a chip module including an integrated circuit and a loop antenna electrically connected to the integrated circuit;
wherein the loop antenna is configured for inductive coupling to the main antenna, forming an RFID circuit with the integrated circuit and the main antenna; and
wherein the main antenna is configured as a pair of symmetrical metallic surface portions arranged on opposite sides of the inlay and connected to each other by a linear connecting portion extending around at least part of the chip module, and wherein the pair of symmetrical metallic surface portions covers at least 60% of the surface of the substrate.

* * * * *